(12) United States Patent
Pleasants

(10) Patent No.: US 6,651,377 B1
(45) Date of Patent: Nov. 25, 2003

(54) LIVE BAIT DISPENSING APPARATUS

(76) Inventor: John P. Pleasants, 216 E. White Rd., Collierville, TN (US) 38017

(*) Notice: Subject to any disclaimer, the term of this patent is extended or adjusted under 35 U.S.C. 154(b) by 0 days.

(21) Appl. No.: 09/969,933

(22) Filed: Oct. 3, 2001

(51) Int. Cl.[7] .............................................. A01K 97/04
(52) U.S. Cl. ............................................................ 43/55
(58) Field of Search ........................................ 43/55, 4

(56) References Cited

U.S. PATENT DOCUMENTS

| | | | |
|---|---|---|---|
| 2,160,436 A | 5/1939 | Jones | 43/55 |
| 2,579,549 A | 12/1951 | Cave | 43/55 |
| 2,718,088 A * | 9/1955 | Perry et al. | 221/265 |
| 2,726,479 A * | 12/1955 | Huse | 43/100 |
| 2,786,297 A | 3/1957 | Simmons | 43/55 |
| 2,843,968 A | 7/1958 | Dohrer | 43/55 |
| 2,857,705 A | 10/1958 | Woodcock | 43/55 |
| 2,883,788 A * | 4/1959 | Stitt | 43/55 |
| 3,308,570 A | 3/1967 | Horton | 43/55 |
| 4,047,320 A | 9/1977 | Lee | 43/55 |
| 4,110,931 A * | 9/1978 | Maness | 221/220 |
| 4,158,267 A * | 6/1979 | Farnsworth | 43/55 |
| 4,207,993 A * | 6/1980 | Ellis et al. | 221/256 |
| 4,815,230 A | 3/1989 | Allen | 43/55 |
| 5,067,270 A * | 11/1991 | Garrick | 43/55 |
| 5,103,585 A | 4/1992 | Pleasants | 43/55 |
| 5,231,791 A * | 8/1993 | Falkson | 43/107 |
| 6,404,970 B1 * | 6/2002 | Gransden et al. | 385/140 |

* cited by examiner

*Primary Examiner*—Charles T. Jordan
*Assistant Examiner*—Tara M Golba
(74) *Attorney, Agent, or Firm*—Wyatt, Tarrant & Combs, L.L.P.

(57) ABSTRACT

A live insect (e.g. cricket) dispensing cage to be used by fishermen enables one insect at a time to be selectively dispensed and encourages the insect to travel within the cage interior to a distal end portion of the cage housing that is less illuminated and that has a dispensing outlet. A trigger and pushrod linkage arrangement can be used to open and close a valve that registers in an outlet opening through which insects are to be dispensed.

29 Claims, 4 Drawing Sheets

LIVE BAIT DISPENSING APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for dispensing live bait to a fisherman and preferably for dispensing live insects such as crickets and the like. More particularly, the present invention relates to an improved live insect cage and dispensing device that features a housing having an outlet that is moveable between opened and closed positions, wherein an improved linkage enables a user to quickly open and close the outlet and wherein the housing has an outer wall that varies light transmission to the interior of the housing, preferably along a gradient between end portions of the housing so that the dispensing end portion is darker than other portions of the housing.

2. General Background of the Invention

Freshwater fishermen often use live insects as bait when pursuing certain freshwater fish such as bream, bass, perch and the like. For many, many years, a cylindrically shaped cage has been commercially available to fishermen. This prior art cricket cage contains live insects such as crickets, providing a dispensing end portion with an outlet through which the insects can be dispensed one at a time for use by the fishermen. These "cricket cages" as they are commonly called provide a closure plug for closing the outlet opening. The plug can be a cork, rubber stopper, or closure cap. In such commercially available cricket cages, a user must manually remove the cork, stopper or closure cap with one hand while holding the cage with the other hand. This is an awkward method and apparatus for dispensing live insect bait (e.g. crickets) because both hands of the user are occupied, one with the cage and the other with the closure cap or stopper. Additionally, such commercially available cricket cages typically provide a uniform screen wall that enable the crickets to disperse themselves evenly over the entire cage and away from the outlet opening. The user must typically hold the cage in one hand, remove the stopper, closure or cork, and then shake the cage in order to dispense one of the live insects through the outlet opening. Many crickets escape as the user attempts to catch them as they emerge from the cage via the outlet opening.

Another commercially available, prior art insect cage that is used by fisherman is a cube shaped or cylindrically shaped box container having a large opening on one wall. The opening enables the human hand to pass through it and obtain access to the inside of the cage. This large opening is surrounded by a peripheral skirt of a plastic material that is slippery (e.g. polypropylene or other soft plastic) so that the insects cannot easily crawl from the cage interior to the exterior thereof through this enlarged opening. However, the insects typically congregate immediately behind the annular skirt so that the fishermen must tap the cage several times against the bottom of the boat or dock in order to dislodge the insects. Hopefully the fisherman is quick enough to grab an insect before the insects quickly retreat behind the annular skirt at the top of the cage.

Various live bait cages for holding insects have been patented. The following are examples of U.S. Patents for such devices and all are hereby incorporated herein by reference:

An early U.S. Pat. No. 2,160,436 issued to Jones is entitled "Grasshopper Holder". This patent shows a cage having solid walls and a tapered or conical section with an outlet opening having a closure plate. This cage apparatus is directed to holding grasshoppers for fishing purposes.

Another grasshopper dispenser is the subject of the Cave U.S. Pat. No. 2,579,549.

A dispensing receptacle is the subject of U.S. Pat. No. 2,786,297. The apparatus is said to be useful for dispensing bait such as minnows, small fish or other live bait such as insects or the like.

The Dohrer U.S. Pat. No. 2,843,968 is directed to a storing and dispensing apparatus for crickets.

U.S. Pat. No. 2,857,705 issued to J. Woodcock provides a bait dispenser that includes a container having a conically shaped end portion with a dispensing outlet. The apparatus is said to be useful for preserving and dispensing bait such as crickets.

A fishing bait container for holding live insects is disclosed in U.S. Pat. No. 3,308,570 entitled "Fishing Bait Containers".

U.S. Pat. No. 4,047,320 issued to Lee provides a bait dispenser for use by fisherman which includes a container for carrying live bait to be dispensed and a cooperating dispenser tube having a slot cut in the end thereof to form a pair of jaws with levers attached, which levers facilitate a widening of the slot when depressed. The bait dispenser also includes a spring loaded plunger on the dispenser tube which communicates with the interior of the tube to block the passage of live bait through the tube.

A cricket dispenser is disclosed in U.S. Pat. No. 4,815, 230. In the '230 patent, a cricket dispensing nozzle has a generally annular open end for communicating with the source of crickets. Four resilient prongs emerge from the annular member and converge toward a dispensing opening in a continuous manner. Spaces between the four prongs permit insertion of a hook, both through that space and through the space below so that the hook may be passed through the cricket twice and the cricket removed from the nozzle without otherwise damaging the cricket.

A cricket gun is disclosed in the Pleasants patent 5,103, 585 that can be used by fishermen to dispense live insects such as crickets. The cricket gun of the '585 patent includes a bait container for holding a limited supply of crickets with a bait dispensing head attached to the funnel end of the cage. On the opposite end of the cage is a spring loaded handle. By compressing the handle, a cricket is allowed to enter and be entrapped in the dispenser head chamber. The cricket may be discharged by pulling back on the release trigger. When the release trigger is pulled back the carriage is pulled forward allowing the cricket to fall out the bottom of the dispenser head. When the trigger is released the spring loaded carriage is pulled back into position. The cricket gun enables a fisherman to discharge one insect at a time or keep one in reserve in the isolated chamber for later use.

BRIEF SUMMARY OF THE INVENTION

The present invention provides an improved live bait dispensing cage for dispensing live insects (for example, crickets, grasshoppers, grubs and the like). The apparatus has particular utility to fresh water fishermen.

The apparatus includes a housing having an outer wall surrounding a hollow interior. The housing includes proximal and distal end portions.

An outlet opening at the distal end of the housing extends through the housing wall. A trigger mechanism is attached to the housing for operating a linkage that connects between the trigger mechanism and a valve member.

The valve member is attached to the linkage and moves with it. The valve member is moved by the linkage between open and closed positions. In the closed position, the valve member closes the outlet opening so that no live insects can escape from the housing interior.

In one embodiment, the housing has a plurality of wall openings that enable light to pass through to the interior housing. In the preferred embodiment, more light passes through the wall at one end portion of the housing than at the other end portion of the housing.

In the preferred embodiment, the wall achieves variable light transmission (i.e. a gradient) by providing openings through the wall of larger diameter at the proximal end of the housing, holes of smaller diameter at the distal end of the housing, and holes at the central portion of the housing that vary in diameter between larger and smaller moving proximally to distally.

This variable light intensity can also be generated by other means such as by providing a solid, translucent wall that has a variable tint between its end portions, the darker tint being provided at the distal end portion. In the preferred embodiment, the outlet opening is preferably positioned at the opposite end portion of the housing from the trigger.

In the preferred embodiment, the housing can be an elongated tubular member.

In the preferred embodiment, a linkage can include a pushrod that extends between the trigger and the valve member.

The present invention also provides an improved method of dispensing live insects to a fisherman for use as live bait during fishing.

The method includes providing a housing having an interior with first and second end portions that enable a plurality of live insects to be caged, the housing having a wall surrounding the interior, a dispensing end portion with an outlet, defining said first end portion.

The method further includes the step of illuminating the interior of the housing differentially along a majority of the length of the housing between the first and second end portions. The housing interior is preferably illuminated to a lesser degree next to the outlet opening and to a larger degree at the second end portion.

A gradient of illumination is thus preferably provided for the housing interior between the first and second end portions. The interior gradually darkens as insects travel proximally to distally within the housing. This concentrates the insects at the darker, distal end as they seek shelter in the darker area.

In the preferred method, this step of illuminating the interior can be accomplished by providing a wall that has openings of varying diameter and positioning the varying diameter openings along the length of the housing to define light transmitting openings that illuminate the interior of the housing to a lesser degree distally and to a greater degree proximally. The light intensity within the housing interior can be a gradually increasing intensity along the length of the housing, distally to proximally.

The method can provide the use of a manually operable valve member to open and close the outlet opening. The method further contemplates a housing that is configured to encourage the insects contained within the house to gravitate toward the first or distal end portion of the housing, interior because it is illuminated less than the second or proximal end portion of the housing. The distal portion is also preferably illuminated less than the central portion of the housing.

BRIEF DESCRIPTION OF THE SEVERAL VIEWS OF THE DRAWINGS

For a further understanding, of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
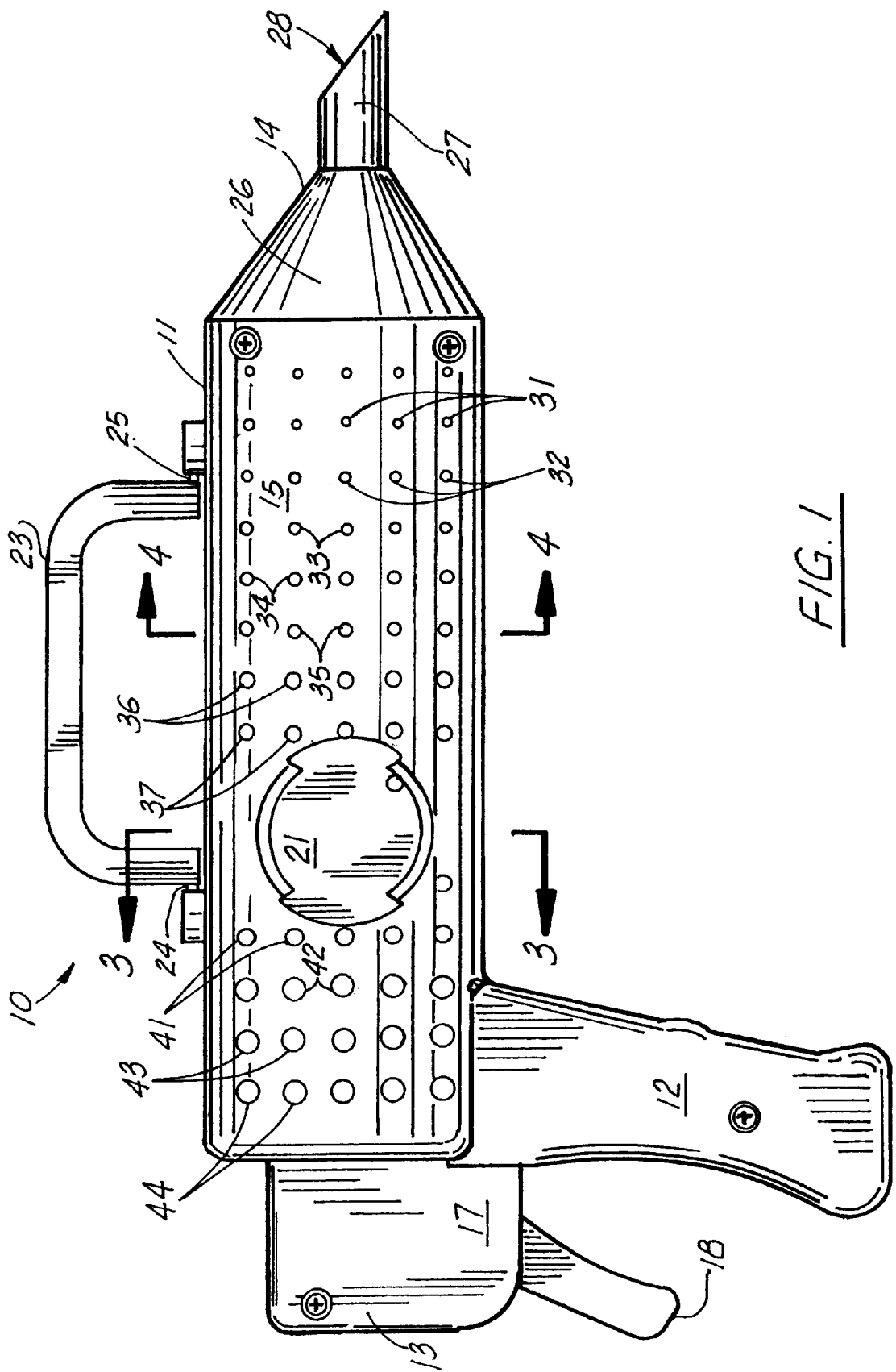
FIG. 1 is a side perspective view of the preferred embodiment of the apparatus of the present invention.

FIGS. 1–4 show the preferred embodiment of the present invention designated generally by the numeral 10. Live insect dispensing cage apparatus 10 is comprised of a housing 11 that can have a handle 12 for enabling a user to grip and manipulate the housing 11. Housing 11 have end portions 13 and 14. End portion 13 is a proximal end portion next to a users hand when the user grips the handle 12 during use. End portion 14 is a distal end portion that is next to a dispensing outlet opening 30. Housing 11 can be an elongated structure that includes a generally cylindrically shaped portion or a section 15. Housing 11 has an interior 16 for containing live insects 58 that are useful to a fisherman such as, for example, crickets, grasshoppers, grubs, or the like.

Proximal end portion 13 has a trigger support 17 that extends behind handle 12 as shown in the drawings. Trigger support 17 has trigger 18 pivotally attached thereto at pivot 19. Trigger 18 can be used by an operator to move pushrod 20 or other suitable linkage. The pushrod 20 can be connected at one end portion to trigger 18 and at its other end portion to valve member 454. The valve member 454 is moveable between open (FIG. 7) and closed (FIG. 2) positions for opening and closing the outlet opening 30.

Figure 2:
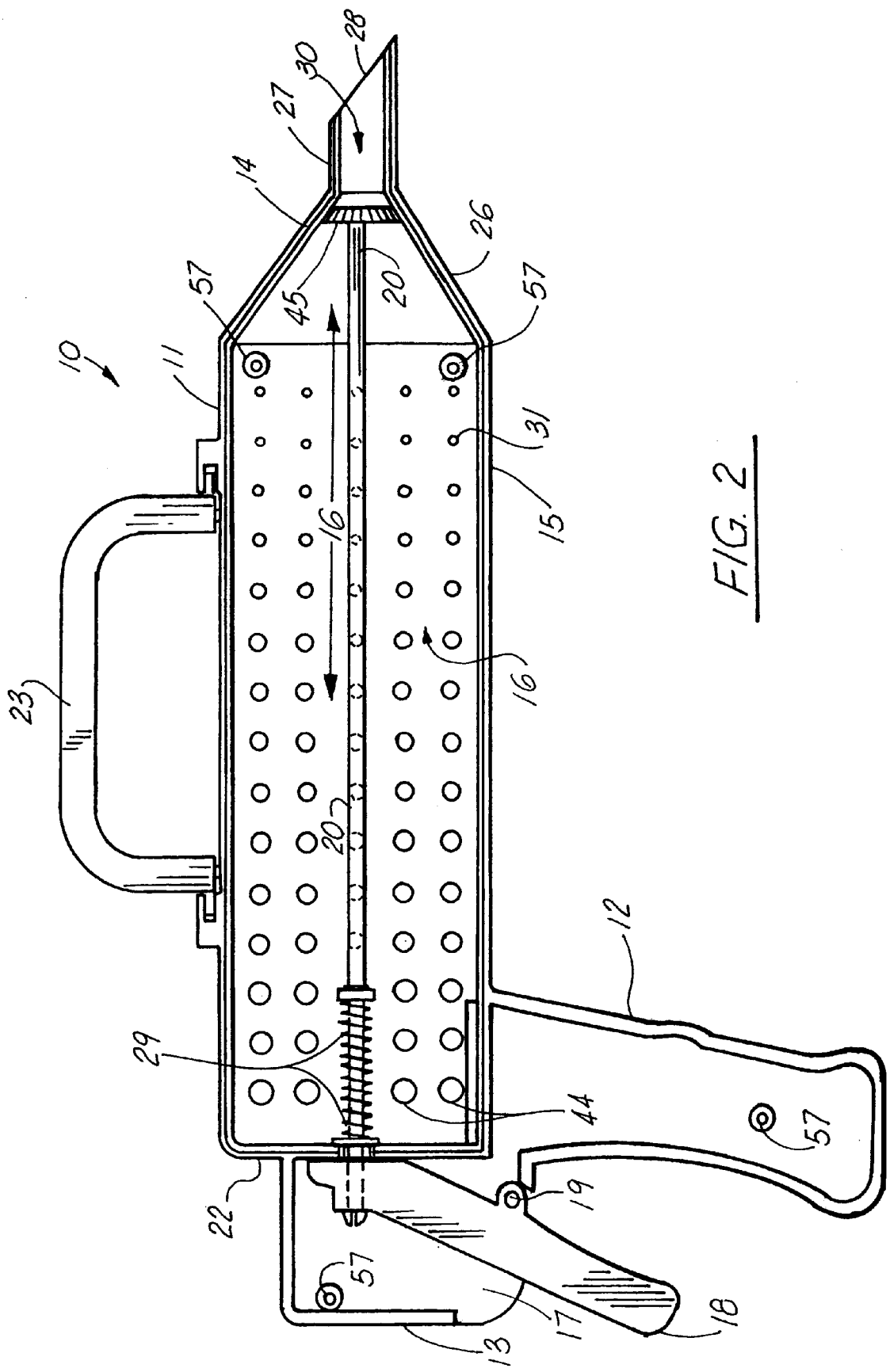
FIG. 2 is a side sectional view of the preferred embodiment of the apparatus of the present invention.
Figure 3:
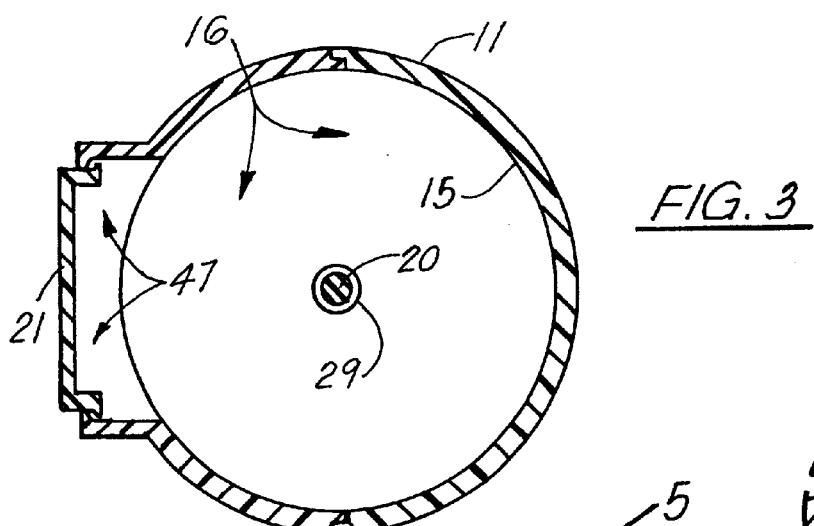
FIG. 3 is a sectional view of the preferred embodiment of the apparatus of the present invention taken along lines 3—3 of FIG. 1.
Figure 5:
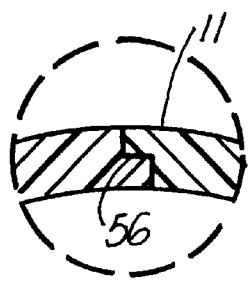
FIG. 5 is a fragmentary view of the preferred embodiment of the apparatus of the present invention.
Figure 4:
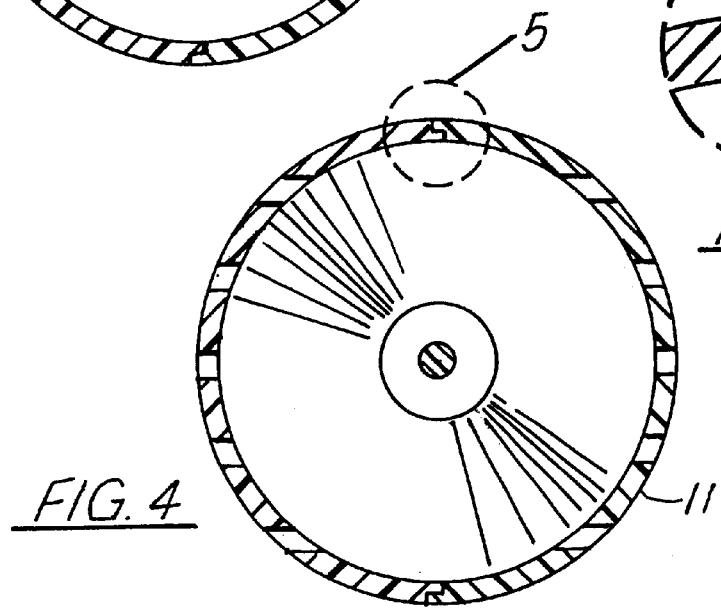
FIG. 4 is a sectional view of the preferred embodiment of the apparatus of the present invention taken along lines 4—4 of FIG. 1.

During use, an operator holds handle 12 using primarily the fingers of one hand. The user also grips trigger 18 with the thumb of the same hand. The user then squeezes the trigger 18 toward handle 12 in the direction of arrow 46. This action of squeezing trigger 18 overcomes the return spring 29 that normally holds the valve 454 in a closed position as shown in FIG. 2.

Trigger support 17 can extend away from transverse plate 22 that is part of the cylindrical section 15 that is at the central part of the apparatus 10.

In order to fill the apparatus 10 with live insects 58 such as crickets, grasshoppers, grubs or the like, a fill opening 47 is provided that communicates with interior 16. Closure plate 21 can be fitted to opening 47 for closing it after a desired number of live insects 58 have been added to the interior 16. Once the live insects 58 are contained within interior 16 and the closure plate 21 has been fitted and sealed to fill opening 47, the apparatus 10 can be carried using handle 23. By placing fill opening 47 and plate 21 in the side wall of housing 11, away from its end portions, live insects 58 will not congregate at opening 47 thereby enabling them an opportunity to escape when cover 21 is removed. The handle 23 can be pivotally attached to cylindrical section 15 of housing 11 at pivots 24, 25.

Figure 7:
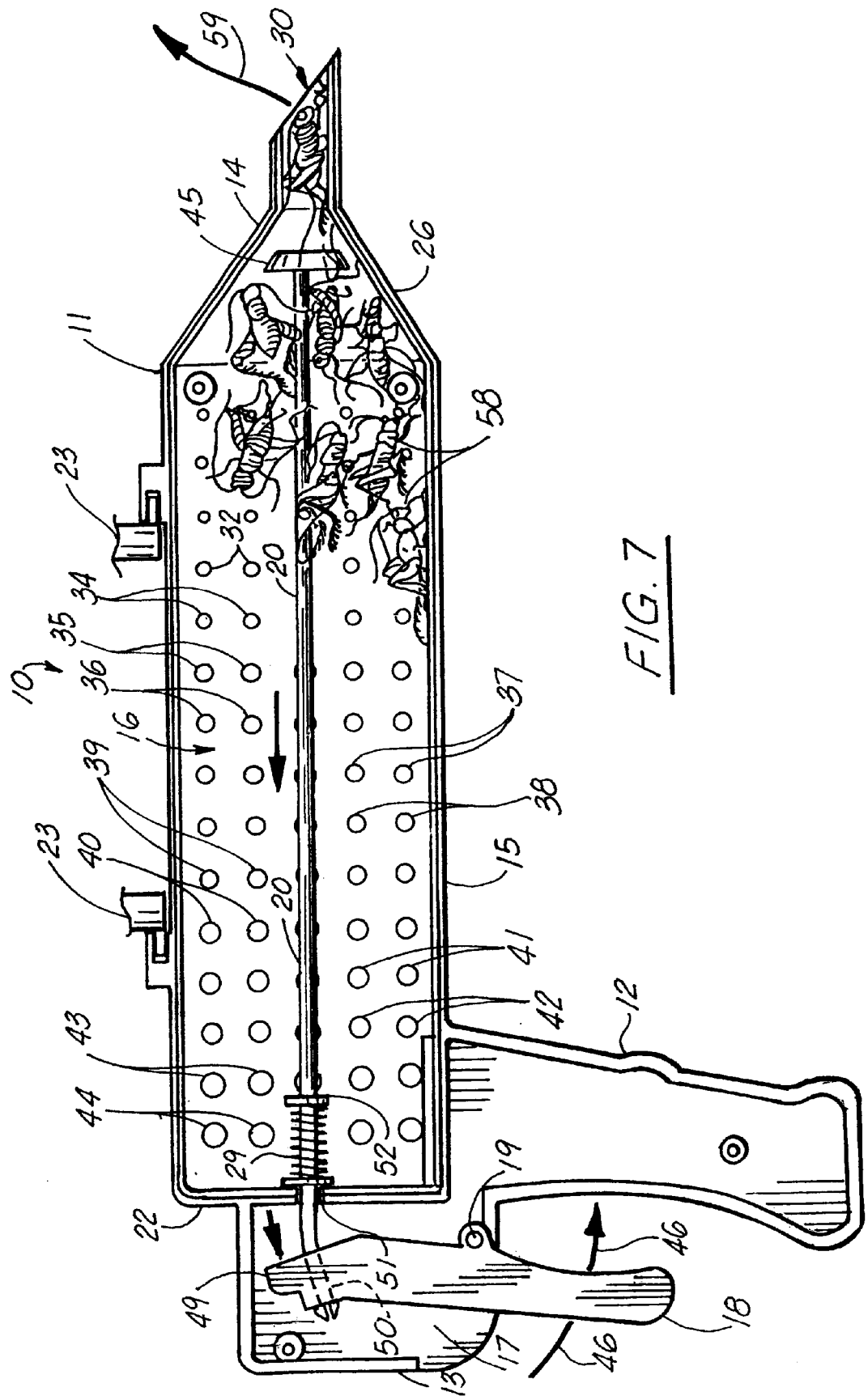
FIG. 7 is a sectional view of the preferred embodiment of the apparatus of the present invention showing the trigger, pushrod, and valve in an open position.

Once the insects 58 are contained within interior 16, they tend to gravitate toward distal end portion 14 as will be described more fully herein after. The end portion 14 includes a cone-shaped portion 26 that is preferably a solid wall of material that does not have any openings. An outlet tube 27 is fitted to cone 26. The outlet tube 27 can be beveled, providing beveled surface 28. Outlet opening 30 is provided in outlet tube 27. The combination of the outlet opening 30 and the beveled surface 28 provides a structure that enables a user to very quickly dispense a cricket from the apparatus 10 into a user's hand. When a live insect 58 enters the outlet tube 27 as shown in FIG. 7, the live insect 58 can be easily discharged into a users hand by rapidly flipping the outlet tube 27 in the direction of arrow 59 as shown in FIG. 7. The outlet tube 27 communicates with interior 16 so that insects 58 contained within interior 16 can travel the length of the apparatus 10 and be dispensed through cone-shaped portion 26, then outlet tube 27, and through outlet opening 30.

In order to ensure that most of the live insects 58 contained within interior 16 gravitate or travel toward distal end portion 14, the wall 48 of housing 11 provides a gradient of light transmission that provides a brighter illumination to the interior 16 at proximal end 13 and a lesser illumination at end portion 14. This can be provided, for example, by means of a plurality of openings that include smaller diameter openings 31 next to distal end portion 14 and larger diameter openings 44 next to proximal end portion 13. In the preferred embodiment, there are a plurality of openings 32–43 in between the smallest openings 31 and the largest openings 43. The openings 31–44 can be, for example, sequentially of larger and larger diameter, beginning with the smallest diameter opening 31 and gradually increasing in diameter with openings 32, 33, 34, 35, etc. until the largest diameter 44 is reached.

In the preferred embodiment, the valve 45 can simply be an enlarged diameter portion of pushrod 20 provided at the distal end portion of pushrod 20. Trigger 18 can provide an upper end portion 49 to which pushrod 20 is attached at connection 50. Pushrod 20 passes through channel 51 in transverse plate 22 of housing 11. A flat washer or other retainer can be provided at channel 51 so that it retains one end of return spring 29. The other end of return spring 29 presses against stop 52 mounted on pushrod 20. The return spring 29 can thus be a coil spring that is mounted upon pushrod 20 as shown in the drawings.

Figure 6:
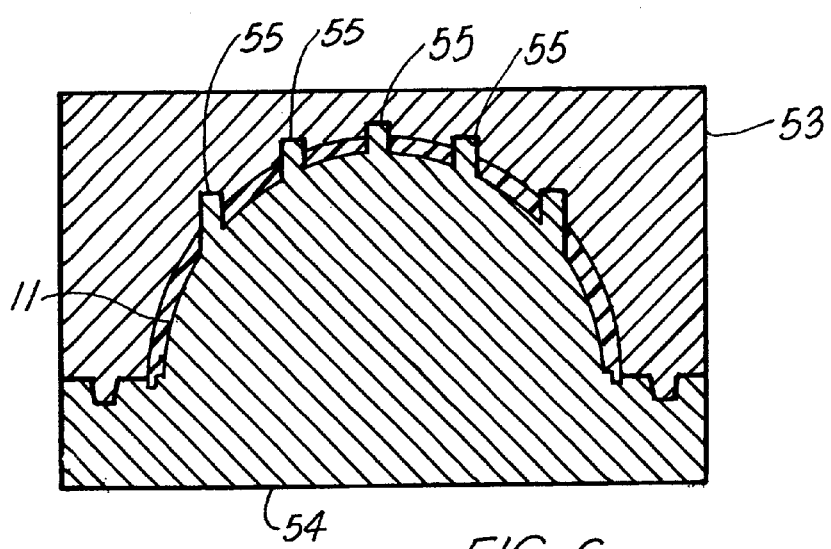
FIG. 6 is a schematic view that illustrates injection molding of a section of the housing portion of the preferred embodiment of the apparatus of the present invention.

The housing 11 can be formed in halves, each half being injection molded for example. In FIG. 6, mold sections 53, 54 are shown, the section 54 having a plurality of projections 55 for forming the openings 31–44. An overlapping joint 56, for example, can be used at the interface between the half sections of the housing 11. The housing half sections can be fastened together using screws 57.

PARTS LIST

The following is a list of parts and materials suitable for use in the present invention:

| PART NUMBER | DESCRIPTION |
| --- | --- |
| 10 | Live insect dispensing cage |
| 11 | housing |
| 12 | handle |
| 13 | end portion |
| 14 | end portion |
| 15 | cylindrical section |
| 16 | interior |
| 17 | trigger support |
| 18 | trigger |
| 19 | pivot |
| 20 | pushrod |
| 21 | closure plate |
| 22 | transverse plate |
| 23 | handle |
| 24 | pivot |
| 25 | pivot |
| 26 | cone shaped portion |
| 27 | outlet tube |
| 28 | beveled surface |
| 29 | return spring |
| 30 | outlet opening |
| 31 | smallest opening |
| 32 | opening |
| 33 | opening |
| 34 | opening |
| 35 | opening |
| 36 | opening |
| 37 | opening |
| 38 | opening |
| 39 | opening |
| 40 | opening |
| 41 | opening |
| 42 | opening |
| 43 | opening |
| 44 | largest opening |
| 45 | valve |
| 46 | arrow |
| 47 | fill opening |
| 48 | wall |
| 49 | upper end portion |
| 50 | connection |
| 51 | channel |
| 52 | stop |
| 53 | mold section |
| 54 | mold section |
| 55 | projection |
| 56 | overlapping joint |
| 57 | screw |
| 58 | live insect |
| 59 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are-presented by way of example only; the scope of the present invention is to be limited only by the following claims.

What is claimed is:

1. A live insect dispensing device for dispensing live insects useful as fishing bait comprising:

a) a housing having an outer wall surrounding a hollow interior, the housing having proximal and distal end portions;

b) an outlet opening that extends through the housing wall;
c) a trigger movably attached to the housing;
d) a linkage, one end of which connects to the trigger;
e) a valve member that is attached to the other end of the linkage, the linkage moving the valve member between open and closed positions; and
f) the housing outer wall having a plurality of openings varying in size from the proximal end of the housing to the distal end of the housing that allows light to pass through to the interior, wherein more light passes through the wall at one end portion of the housing than at the other end portion.

2. The live insect dispensing device of claim 1 wherein the outer wall has a plurality of openings extending from the proximal end to the distal end, each succeeding opening, being smaller in size than the preceding opening, that allow light to enter the housing interior.

3. The live insect dispensing device of claim 2 wherein the plurality of openings include successive rings of openings disposed circumferentially around the periphery of the outer wall, the size of all the openings in any given ring being similar and the size of the openings of each successive ring being smaller than the preceding ring.

4. The live insect dispensing device of claim 3 wherein the outlet opening is positioned generally opposite the trigger.

5. The live insect dispensing device of claim 2 wherein the housing includes a fill opening communicating with the interior of the housing and a closure plate fixedly secured to the housing covering the fill opening when the housing contains insects.

6. The live insect dispensing device of claim 1 wherein the trigger is mounted to the housing at an end portion of the housing.

7. The live insect dispensing device of claim 1 wherein the housing is an elongated tubular member.

8. The live insect dispensing device of claim 1 wherein one end portion of the housing has a conically shaped portion.

9. The live insect dispensing device of claim 8 wherein the outlet opening communicates with the conically shaped portion.

10. The live insect dispensing device of claim 1 wherein the trigger is pivotally mounted to the housing.

11. The live insect dispensing device of claim 1 wherein the linkage includes a pushrod that extends between the trigger and the valve member.

12. A live insect dispensing device for dispensing live insects useful as fishing bait comprising:
    a) a housing having an outer wall surrounding a hollow interior, the housing having proximal and distal end portions;
    b) an outlet opening that extends through the housing wall;
    c) a valve member movably attached to the housing at the outlet opening between open and closed positions;
    d) means supported upon the housing for moving the valve member between said open and closed positions;
    e) said valve member occupying said outlet opening when in the closed position; and
    f) the housing outer wall having a plurality of openings varying in size from the proximal end of the housing to the distal end of the housing that allows light to pass through to the interior, wherein more light passes through the wall at one end portion of the housing than at the other end portion.

13. The live insect dispensing device of claim 12 wherein the outer wall has a plurality of openings extending from the proximal end to the distal end, each succeeding opening, being smaller in size than the preceding opening that allow light to enter the housing interior.

14. The live insect dispensing device of claim 13 wherein the plurality of openings include successive rings of openings disposed circumferentially around the periphery of the outer wall, the size of all the openings in any given ring being similar and the size of the openings of each successive ring being smaller than the preceding ring.

15. The live insect dispensing device of claim 13 wherein the housing includes a fill opening communicating with the interior of the housing and a closure plate fixedly secured to the housing covering the fill opening when the housing contains insects.

16. The live insect dispensing device of claim 12 including a trigger wherein the trigger is mounted to the housing at an end portion of the housing.

17. The live insect dispensing device of claim 16 wherein the outlet opening is positioned generally opposite the trigger.

18. The live insect dispensing device of claim 12 wherein the housing is an elongated tubular member.

19. The live insect dispensing device of claim 12 wherein one end portion of the housing has a conically shaped portion.

20. The live insect dispensing device of claim 19 wherein the outlet opening communicates with the conically shaped portion.

21. The live insect dispensing device of claim 12 having a trigger wherein the trigger is pivotally mounted to the housing.

22. The live insect dispensing device of claim 12 having a trigger and a linkage wherein the linkage includes a pushrod that extends between the trigger and the valve member.

23. A live insect dispensing device for dispensing live insects useful as fishing bait, comprising:
    a) a housing having an outer wall surrounding a hollow interior, the housing having proximal and distal end portions;
    b) an outlet opening that extends through the housing wall;
    c) a valve member that is attached to the housing for selectively opening or closing the outlet opening; and
    d) the housing outer wall having a plurality of openings varying in size from the proximal end of the housing to the distal end of the housing that allows light to pass through to the interior, wherein more light passes through the wall at one end portion of the housing than at the other end portion.

24. A method of dispensing live insects to a fisherman for use as live bait during fishing comprising the steps of:
    a) providing a housing having first and second end portions, an interior that enables a plurality of live insects to be caged, the housing having a wall surrounding the interior, a dispensing outlet at the first end portion;
    b) illuminating the interior of the housing differentially along the length of the housing between the first and second end portions so that the housing interior is illuminated to a lesser degree next to the outlet opening and to a larger degree at the second end portion;
    c) using a graduated openings in the housing wall to provide a gradient of illumination between the first and second end portions;

d) filling the interior with insects; and e) dispensing insects from the interior via the outlet opening.

25. The method of claim 24 wherein in step "a" the wall has openings of varying diameter and in step "b" the varying diameter openings are positioned along the length of the housing to define light transmitting openings that illuminate the interior of the housing.

26. The method of claim 24 further comprising the step of using a manually operable valve member to open and close the outlet opening.

27. The method of claim 24 wherein the wall is a translucent wall that allows different amounts of light transmission at different positions along the length of the housing.

28. The method of claim 24 wherein in step "e" the insects naturally gravitate toward the first end portion of the housing interior because it is illuminated less than the second end portion of the housing.

29. The method of claim 28 wherein the housing has a central portion and the central portion is illuminated less than the second portion.

* * * * *